US008284944B2

(12) United States Patent
Bandaram et al.

(10) Patent No.: US 8,284,944 B2
(45) Date of Patent: Oct. 9, 2012

(54) UNIFIED AND PERSISTENT SYSTEM AND METHOD FOR AUTOMATIC CONFIGURATION OF ENCRYPTION

(75) Inventors: Satheesh E. Bandaram, Fremont, CA (US); Huaxin Gao, San Jose, CA (US); Bilung Lee, Fremont, CA (US); Paul Arnold Ostler, Boise, ID (US)

(73) Assignee: International Business Machines Corporation, Armonk, NY (US)

( * ) Notice: Subject to any disclaimer, the term of this patent is extended or adjusted under 35 U.S.C. 154(b) by 1185 days.

(21) Appl. No.: 12/047,972

(22) Filed: Mar. 13, 2008

(65) Prior Publication Data
US 2009/0232315 A1 Sep. 17, 2009

(51) Int. Cl.
*H04L 9/08* (2006.01)
*H04L 9/32* (2006.01)
(52) U.S. Cl. ........................... 380/278; 713/168
(58) Field of Classification Search .................. 380/278; 726/10, 26; 713/168, 182; 707/10
See application file for complete search history.

(56) References Cited

U.S. PATENT DOCUMENTS

| | | | |
|---|---|---|---|
| 5,204,961 A | 4/1993 | Barlow | |
| 6,112,304 A | 8/2000 | Clawson | |
| 6,859,879 B2 * | 2/2005 | Henn et al. | 726/1 |
| 6,999,956 B2 | 2/2006 | Mullins | |
| 7,229,492 B2 | 6/2007 | Chatterji et al. | |
| 7,231,517 B1 | 6/2007 | Mashayekhi | |
| 7,263,192 B2 * | 8/2007 | Morlang et al. | 380/277 |
| 7,761,468 B2 * | 7/2010 | Gao et al. | 707/781 |
| 2002/0116457 A1 | 8/2002 | Eshleman et al. | |
| 2003/0097593 A1 | 5/2003 | Sawa et al. | |
| 2003/0167456 A1 | 9/2003 | Sabharwal | |
| 2005/0108521 A1 | 5/2005 | Silhavy et al. | |
| 2005/0198490 A1 * | 9/2005 | Jaganathan et al. | 713/151 |
| 2006/0112304 A1 | 5/2006 | Subramanian et al. | |
| 2006/0116991 A1 | 6/2006 | Calderwood et al. | |
| 2006/0294080 A1 | 12/2006 | Arnold et al. | |
| 2010/0024038 A1 * | 1/2010 | Bandaram et al. | 726/26 |

FOREIGN PATENT DOCUMENTS

| | | |
|---|---|---|
| WO | 2005067395 A2 | 7/2005 |
| WO | WO 2005/067394 | 7/2005 |

OTHER PUBLICATIONS

U.S. Appl. No. 11/938,261; First Office Action; Filed: Nov. 10, 2007.
U.S. Appl. No. 11/938,261, Bandaram et al.

* cited by examiner

*Primary Examiner* — Nathan Flynn
*Assistant Examiner* — Abdullah Almamun
(74) *Attorney, Agent, or Firm* — Cantor Colburn LLP; Elissa Wang

(57) ABSTRACT

A system and method for database security provides, a database security method that receives an encryption property from an application and receives information relating to a database server. The method then requests security access to a database server using the strongest encryption algorithm server may support. If this request gets turned down, then the method determines the strongest encryption algorithm the server actually supports using the information the database server sent back and calculates the encryption keys. The method then caches the encryption algorithm along with the encryption keys in a persistent storage. For subsequent connections, the method checks the persistent storage first and retrieves the encryption algorithm and encryption keys from the persistent storage if the cache values are available, and sends the cached value to database server. By doing this, the database driver doesn't need to synchronize the encryption algorithm with server and calculate the encryption keys again.

20 Claims, 4 Drawing Sheets

UNIFIED AND PERSISTENT SYSTEM AND METHOD FOR AUTOMATIC CONFIGURATION OF ENCRYPTION

FIELD OF INVENTION

The present invention generally relates to computer implemented database management systems, and particularly to systems and methods for configuring encryption algorithms.

BACKGROUND

Access to databases is usually controlled by database servers. In client/server environments, database servers usually contain a database management system (DBMS), as well as the database. The database server may provide access to a client application through a database driver using a security mechanism. Many different security mechanisms are in use, including those using user IDs and passwords, encrypted passwords, KERBEROS, and others. Database servers typically require a configuration setting that decides what security mechanisms are supported under that configuration setting.

When a high level of security is desired, database server security mechanisms may use encryption. Encryption is an effective means to protect the secrecy of many types of communications. Normally, cryptographic solutions rely upon computationally intensive algorithms to encrypt information. Faster processors and specialized hardware have made these techniques susceptible to compromise, forcing more complex encryption algorithms to be invented in order to ensure security. When a DBMS uses encryption to protect data security, both the DBMS and the database driver need to support these newly available encryption algorithms. Supporting these new encryption algorithms can be a challenge because of the need to add the current and future available encryption algorithms easily and, at the same time, to not break the existing encryption support for the down level DBMS.

One approach to encryption configuration is to add a property for each encryption algorithm so that when an application wants to use a specific encryption algorithm, that property just needs to be turned on. Unfortunately, the application does not really know what encryption algorithm the server supports until connection time, so the encryption algorithm the application turns on may not be supported by the database. Furthermore, as more and more encryption algorithms become available, it is impractical to add a property for every encryption algorithm, without negatively impacting performance.

Accordingly, there is a need for systems and methods for providing secure access to databases by an application. There is also a need for techniques that would provide such access by automatically configuring encryption algorithms in an environment of multiple encryption algorithms. There is also a need for ways to provide encryption algorithm configuration, which can add the current and future available encryption algorithms easily, does not negatively impact performance, and also does not break the existing encryption support for the down level (legacy) DBMS.

SUMMARY OF THE INVENTION

To overcome the limitations in the prior art briefly described above, the present invention provides a method, computer program product, and system for automatically synchronizing encryption algorithms between database servers and database drivers.

In one embodiment of the present invention, a database security method comprises: receiving an encryption property from an application; receiving information relating to a database server; requesting security access to a database server using a first encryption algorithm, the first encryption algorithm being the strongest encryption algorithm the database could support; if the request for database access is rejected by the database server, receiving information from the database server related to encryption algorithms supported by the database server; identifying a second encryption algorithm, which is the strongest encryption algorithm the database server supports based on the information; requesting database access to a database server using the second information; calculating encryption keys; and caching the second encryption algorithm along with the calculated encryption keys in persistent storage.

In another embodiment of the present invention, a system comprises: an application; a database driver; a database server connected to the database driver; an encryption property setting unit for indicating to the database driver whether the application wants to use encryption in communicating with the database server; an encryption algorithm requesting and analyzing interface for requesting and analyzing a supported encryption algorithm from the database server; an encryption algorithm and encryption keys storing and retrieving interface for storing and retrieving the database server encryption algorithm information and encryption related keys; and an encryption and decryption interface for providing encrypted exchange of data between the database driver and the database server.

An additional embodiment of the present invention comprises a computer readable program, wherein the computer readable program when executed on a computer causes the computer to: receive an encryption property from an application; receive information relating to a database server; request security access to a database server using a first encryption algorithm, the first encryption algorithm being the strongest encryption algorithm the database could support; if the request for database access is rejected by the database server, receive additional information from the database server related to the encryption algorithms supported by the database server; identify a second encryption algorithm, which is the strongest encryption algorithm the database server supports based on the additional information; request database access to a database server using the additional information; calculate encryption keys; and cache the second encryption algorithm along with the calculated encryption keys in persistent storage.

Various advantages and features of novelty, which characterize the present invention, are pointed out with particularity in the claims annexed hereto and form a part hereof. However, for a better understanding of the invention and its advantages, reference should be made to the accompanying descriptive matter together with the corresponding drawings which form a further part hereof, in which there are described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION OF THE INVENTION

Figure 1:
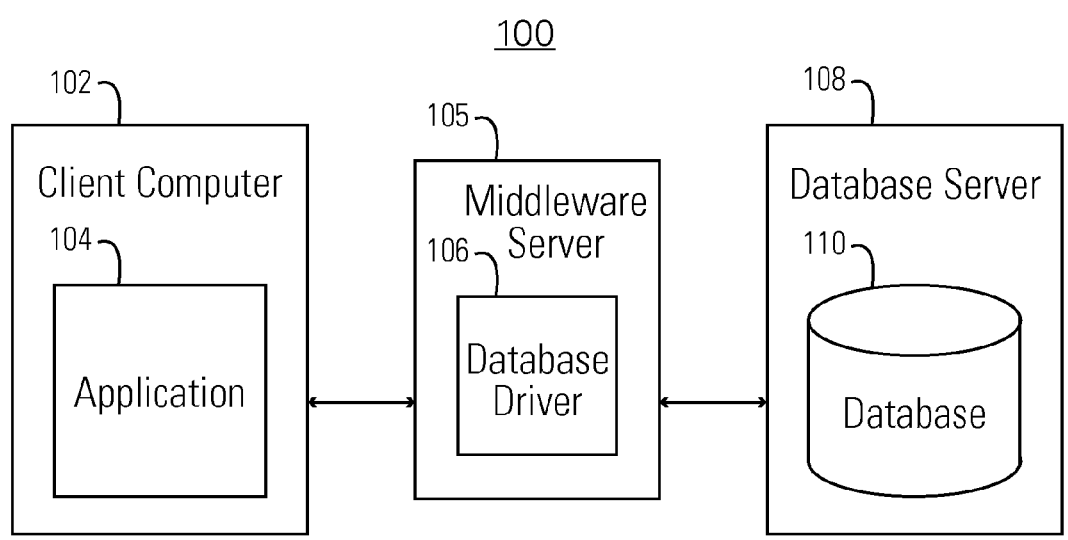
FIG. 1 shows a block diagram of a database system in accordance with one embodiment of the invention.

The present invention overcomes the problems associated with the prior art by teaching a system, computer program product, and method for automatically synchronizing encryption algorithms between database servers and database drivers. In the following detailed description, numerous specific details are set forth in order to provide a thorough understanding of the present invention. Those skilled in the art will recognize, however, that the teachings contained herein may be applied to other embodiments and that the present invention may be practiced apart from these specific details. Accordingly, the present invention should not be limited to the embodiments shown, but is to be accorded the widest scope consistent with the principles and features described and claimed herein. The following description is presented to enable one of ordinary skill in the art to make and use the present invention and is provided in the context of a patent application and its requirements.

The invention addresses problems which arise when an application requests database access and the encryption algorithm requested by the database driver is not supported by the configuration setting on the database server. The system and method of the invention provides a unified and persistent technique for the automatic synchronization of an encryption algorithm of an application with a database server. Embodiments of the present invention also provide a unified and extensible configuration model that can add current and future available encryption algorithms easily without breaking the existing encryption support for the down level DBMS. Prior art database systems did not provide unified and persistent support for the automatic configuration of multiple encryption algorithms with the database server.

Furthermore, embodiments of the present invention provide a unified and extensible configuration technique that can add new encryption algorithms easily. Embodiments of the invention also can automatically pick up the strongest encryption algorithm to use. This information, along with the encryption keys, is stored in the persistent storage for later usage. At the first time of connection, the strongest encryption algorithm is requested first. If the database server does not support this encryption algorithm, the database driver will determine the encryption algorithms the server supports and a new request will be made with the strongest encryption algorithm the server supports. This second encryption algorithm may be the next strongest algorithm the server supports. This encryption algorithm is saved along with the corresponding keys in a persistent storage. Embodiments of the present invention do not retry the encryption algorithm and regenerate encryption keys at every connection time. Instead, after synchronization, the encryption algorithm, along with the computed encryption keys will be cached in persistent storage, so the following connections do not need to do synchronization and compute encryption keys, which takes a significant amount of CPU time. As a result, the present invention will always have the correct encryption algorithm to request the first time, thereby avoiding a retry flow and the need to regenerate keys.

In this way, the present invention comprises a unified and extensible model to add in new encryption algorithms easily, but also significantly improves the performance by saving the encryption algorithm information in storage. Furthermore, this model will also provide interoperability with the down level servers without breaking the legacy behaviors.

FIG. 1 shows a block diagram of a database system 100 in accordance with one embodiment of the invention. A client computer 102 includes an application program 104 and is coupled to a database driver 106 that may reside in a middleware server 105. The database driver 106 is coupled to a database server 108, which includes a database 110, as well as other components such as a database management system (not shown). It will be appreciated by those skilled in the art, that many different configurations of the database system 100 are possible, for example, the database driver 106 may reside in the client computer 102, or in the database server 108.

Figure 2:
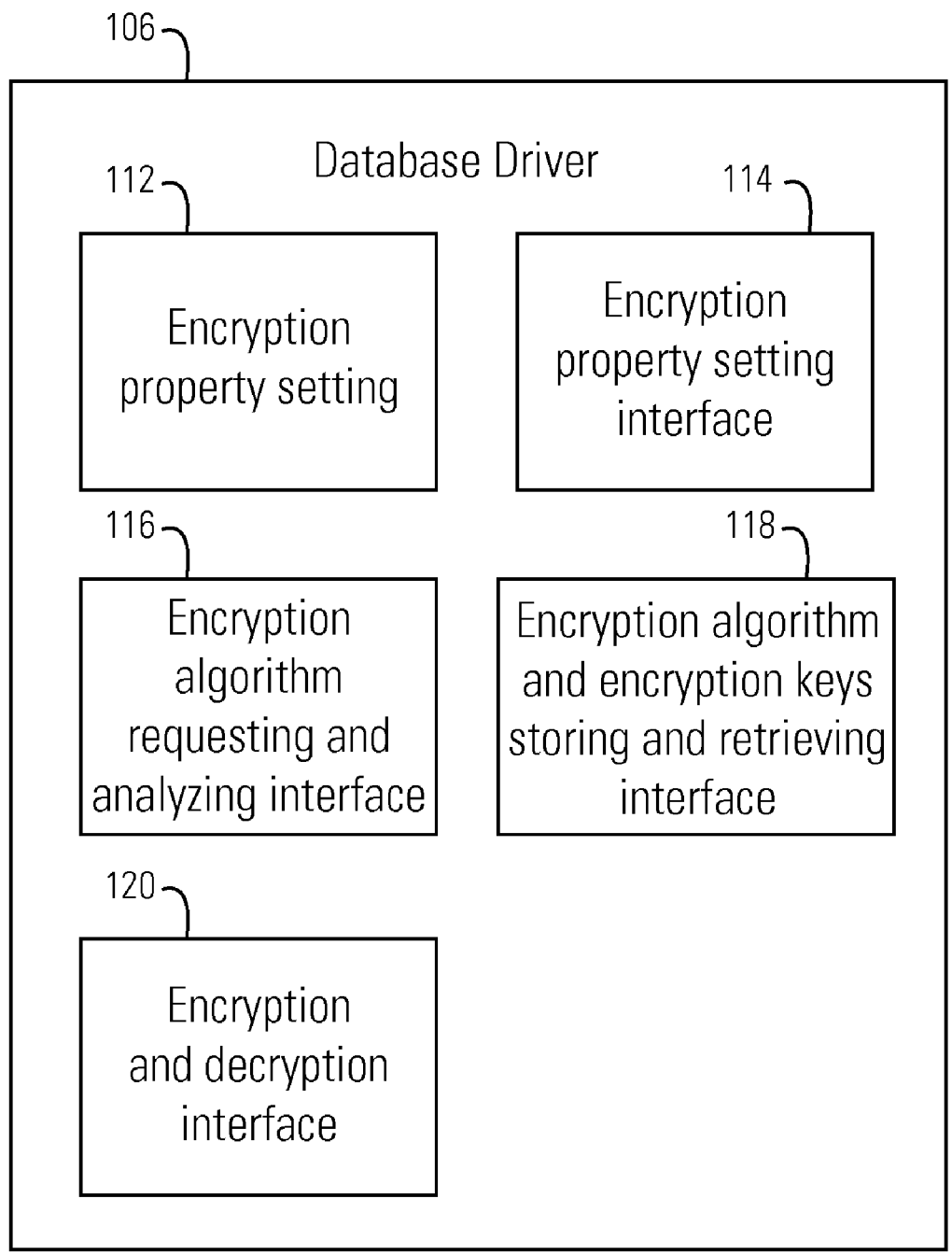
FIG. 2 shows a block diagram of a database driver used in the database system shown in FIG. 1.

FIG. 2 shows additional details of the database driver 106 shown in FIG. 1. An encryption property setting unit 112 indicates whether the application 104, shown in FIG. 1, wants to use encryption, or not. An encryption property setting interface 114 retrieves this encryption property information from the application 104, shown in FIG. 1, and stores it.

An encryption algorithm requesting and analyzing interface 116 is used by the database driver 106 to request the database server's 108, shown in FIG. 1, supported encryption algorithm. The encryption algorithm requesting and analyzing interface 116 also analyzes the encryption algorithm list that is returned from the database server 106. An encryption algorithm and encryption keys storing and retrieving interface unit 118 is used to store and retrieve the database server encryption algorithm information and encryption related keys.

An encryption and decryption interface unit 120 is used by the database driver 106 to encrypt and decrypt data, as described in more detail below.

Figure 3:
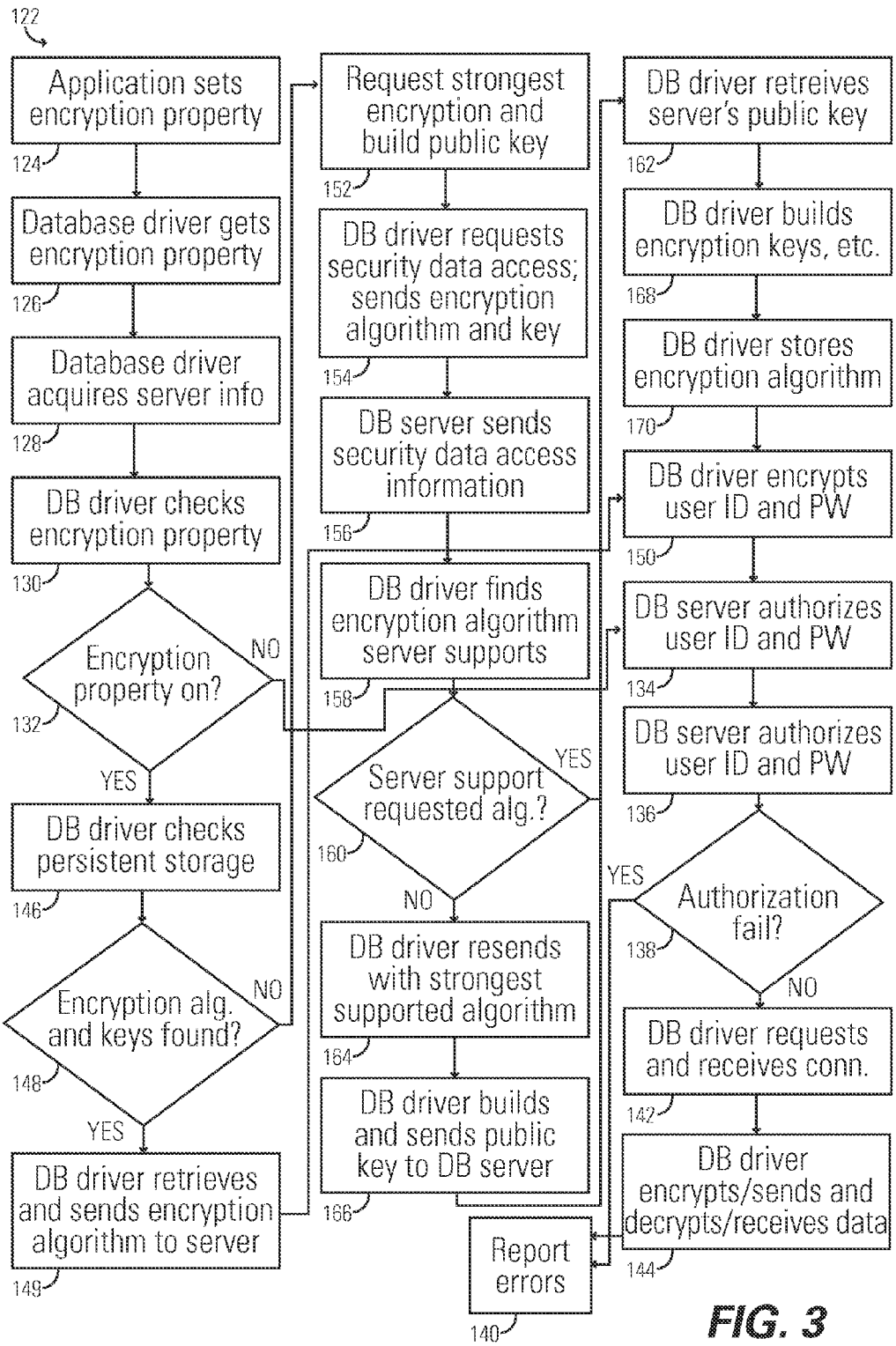
FIG. 3 shows a flow chart of a method of automatically synchronizing security mechanisms between database servers and database drivers.

FIG. 3 shows a flow chart of a method 122 of automatically synchronizing encryption algorithms between database servers and database drivers. In step 124, the application, such as the application 104 shown in FIG. 1, sets an encryption property. The encryption property indicates whether the application wants to use encryption. In step 126, the database driver then acquires this encryption property from the application. This may be done by the encryption property setting interface 114, shown in FIG. 2, and the encryption property setting unit 112, shown in FIG. 2, in the database driver 106, shown in FIG. 1.

In step 128, the database driver acquires server information. The database driver then checks the server information. Then the database driver 106, shown in FIG. 2, checks the encryption property in the encryption property setting unit 112, shown in FIG. 2. The results of this check will be either that the encryption property is on or is not on. In decision step 132, if the encryption property is not on, the method 122 will proceed to step 134 where the database driver will request a security check from the database server. The database driver will also send unencrypted user identification and password information to the database server.

In step 136, the database server attempts to authorize the user identification and password received from the database driver. If this authorization fails in step 138, an error will be reported in step 140. If, instead, the authorization does not fail, then in step 142 the database driver will send a request to the database server for access to the database and the database server will return a connection to the database driver. In step 144, the database driver then sends (unencrypted) data to the database server and receives (unencrypted) data from the database. Any errors are then reported in step 140.

If step 132 had determined that the encryption property was on, then step 146 will cause the database driver to check persistent storage in the database driver for the encryption algorithm and encryption keys. This may be performed by the encryption algorithm requesting an analyzing interface 116, shown in FIG. 2. If the correct encryption algorithm and keys are found, then step 148 will direct the process to step 149 and the database driver will retrieve and send the encryption algorithm to the database server. In step 150, the database driver will encrypt the user identification and password. This may be done by the encryption and decryption interface 120, shown in FIG. 2. Next, steps 134, 136, 138, 142, 144 and 140 will be performed, as generally described above. This time, however, step 134 will send an encrypted user identification and password and step 144 will send and receive encrypted data while, as described above, these steps were performed on unencrypted data. In some embodiments, steps 150 and 144 may be performed using the encryption and decryption interface 120, shown in FIG. 2.

If step 148 had determined that the algorithm and keys for the database server were not found in persistent storage then the database driver requests for the strongest encryption algorithm and builds the corresponding public key, in step 152. In step 154, the database driver requests security data access to the database server and sends the encryption algorithm and public key to the database server. In step 156, the database server sends back the security data access information, including the encryption algorithms the database server supports.

In step 158, the database driver finds out the encryption algorithms the database server supports. This may be done by the encryption algorithm requesting and analyzing interface. Decision step 160 then determines if the database server supports the requested encryption algorithm. If it does, then the method moves to step 162 and the database driver retrieves the server's public key. If decision step 160 determined that the database server does not support the requested encrypted algorithm, then step 164 will resend a request for security data access with the strongest encryption that the database server supports. In step 166, the database driver will then build up and send the public key to the database server.

After step 162, then in step 168, depending on the encryption algorithm and the database server's public key, the database driver will build up encryption keys, initialize the encryption cipher, and perform other steps as required. In step 170, the database driver will then store the encryption algorithm and the encryption related keys. In step 150, the database driver will then encrypt the user identification and password, and steps 134, 136, 138, 140, 142, and 144 are performed, as described above.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
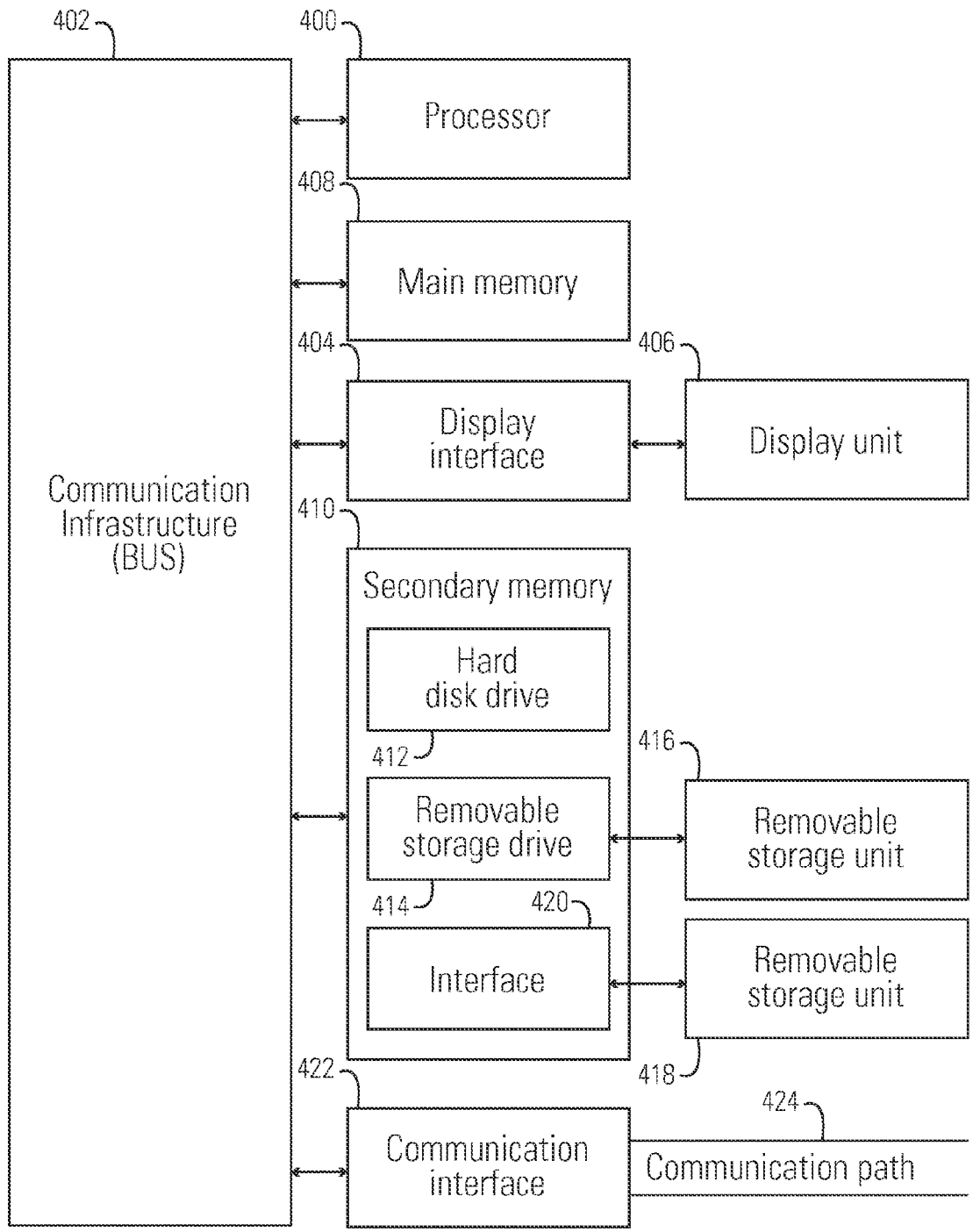
FIG. 4 is a high level block diagram showing an information processing system useful for implementing one embodiment of the present invention.

FIG. 4 is a high level block diagram showing an information processing system useful for implementing one embodiment of the present invention. The computer system includes one or more processors, such as processor 400. The processor 400 is connected to a communication infrastructure 402 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 404 that forwards graphics, text, and other data from the communication infrastructure 402 (or from a frame buffer not shown) for display on the display unit 406. The computer system also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 416 in a manner well known to those having ordinary skill in the art. Removable storage unit 416 represents a floppy disk, a compact disc, magnetic tape, optical disk, etc. which is read by and written to by removable storage drive 414. As will be appreciated, the removable storage unit 416 includes a computer readable medium having stored therein computer software and/or data.

In alternative embodiments, the secondary memory 410 may include other similar means for allowing computer programs or other instructions to be loaded into the computer system. Such means may include, for example, a removable storage unit 418 and an interface 420. Examples of such may include a program cartridge and cartridge interface (such as that found in video game devices), a removable memory chip (such as an EPROM, or PROM) and associated socket, and other removable storage units 418 and interfaces 420 which allow software and data to be transferred from the removable storage unit 418 to the computer system.

The computer system may also include a communications interface 422. Communication interface 422 allows software and data to be transferred between the computer system and external devices. Examples of communication interface 422 may include a modem, a network interface (such as an Ethernet card), a communications port, a PCMCIA slot and card, etc. Software and data transferred via communication interface 422 are in the form of signals which may be, for example, electronic, electromagnetic, optical, or other signals capable of being received by communications interface 422. These signals are provided to communication interface 422 via a communications path (i.e., channel) 424. This channel 424 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 408 and secondary memory 410, removable storage drive 414, a hard disk installed in hard disk drive 412, and signals.

Computer programs (also called computer control logic) are stored in main memory 408 and/or secondary memory 410. Computer programs may also be received via communications interface 422. Such computer programs, when executed, enable the computer system to perform the features of the present invention as discussed herein. In particular, the computer programs, when executed, enable the processor 400 to perform the features of the computer system. Accordingly, such computer programs represent controllers of the computer system.

In accordance with the present invention, we have disclosed systems and methods for synchronizing security mechanisms in database drivers with database servers. Those of ordinary skill in the art will appreciate that the teachings contained herein can be implemented using many kinds of software and operating systems. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

We claim:

1. A database security method comprising:
   receiving an encryption property from an application;
   receiving information relating to a database server;
   requesting security access to the database server using a first encryption algorithm;
   determining that the request for security access to the database server using the first encryption algorithm is rejected by the database server;
   receiving, by a computer, information from said database server related to encryption algorithms supported by said database server;
   identifying, by the computer, a second encryption algorithm from the encryption algorithms supported by said database server;
   requesting, by the computer, security access to the database server using the second encryption algorithm;
   calculating encryption keys; and
   caching said second encryption algorithm along with said calculated encryption keys in persistent storage.

2. The database security method of claim 1, further comprising, for subsequent requests for security access to said database server:
   determining if said persistent storage contains the second encryption algorithm and associated encryption keys; and
   sending said cached encryption keys to said database server if said persistent storage contains said second encryption algorithm.

3. The database security method of claim 1 further comprising encrypting and sending to said database server a user identification and password.

4. The database server security method of claim 1 further comprising requesting authorization for access to a database from said database server.

5. The database security method of claim 4, further comprising receiving access to said database and encrypting data sent to said database and decrypting data received from said database.

6. The database security method of claim 1, wherein said requesting security access to a database server using a first encryption algorithm further comprises:
   building a public key corresponding to said first encryption algorithm; and
   sending said public key along with said first encryption algorithm to said database server.

7. A computer program product comprising a computer usable non-transitory medium having a computer readable program, wherein said computer readable program when executed on a computer causes said computer to:
   receive an encryption property from an application;
   receive information relating to a database server;
   request security access to the database server using a first encryption algorithm;
   determine that the request for security access to the database server using the first encryption algorithm is rejected by said database server;
   receive additional information from said database server related to encryption algorithms supported by said database server;
   identify a second encryption algorithm based on the additional information from the database server;
   request security access to the database server using the second encryption algorithm;
   calculate encryption keys; and
   cache said second encryption algorithm along with said calculated encryption keys in persistent storage.

8. The computer program product of claim 7 wherein for subsequent requests for security access to said database server, said computer readable program further causes said computer to:
   determine if said persistent storage contains the second encryption algorithm and associated encryption keys; and
   send said cached encryption keys to said database server if said persistent storage contains said second encryption algorithm.

9. The computer program product of claim 7, wherein said computer readable program further causes said computer to encrypt and send to said database server a user identification and password.

10. The computer program product of claim 7, wherein said computer readable program further causes said computer to request authorization for access to a database from said database server.

11. The computer program product of claim 10, wherein said computer readable program further causes said computer to receive access to said database and encrypt data sent to said database and decrypting data received from said database.

12. The computer program product of claim 7, wherein said requesting security access to said database server using said first encryption algorithm further comprises building a public key corresponding to said first encryption algorithm.

13. The computer program product of claim 7, wherein said requesting security access comprises sending an encryption algorithm and public key to said database server, and wherein said computer readable program further causes said computer to:
determine whether said database server supports said first encryption algorithm; and
if said database server does not support said first encryption algorithm, determine the strongest encryption algorithm said database server supports.

14. The computer program product of claim 7, wherein said computer readable program further causes said computer to: calculate encryption keys for said second encryption algorithm; and cache said calculated encryption keys and said second encryption algorithm in persistent storage.

15. A computer system comprising:
a database driver and a processor, the system configured to perform a method comprising:
receiving an encryption property from an application;
receiving information relating to a database server;
requesting security access to the database server using a first encryption algorithm;
determining that the request for security access to the database server using the first encryption algorithm is rejected by the database server;
receiving information from said database server related to encryption algorithms supported by said database server;
identifying a second encryption algorithm from the encryption algorithms supported by said database server;
requesting security access to the database server using the second encryption algorithm;
calculating encryption keys; and
caching said second encryption algorithm along with said calculated encryption keys in persistent storage.

16. The system of claim 15, wherein the method further comprises, for subsequent requests for security access to said database server:
determining if said persistent storage contains the second encryption algorithm and associated encryption keys; and
sending said cached encryption keys to said database server if said persistent storage contains said second encryption algorithm.

17. The system of claim 15, wherein the method further comprises encrypting and sending to said database server a user identification and password.

18. The system of claim 15, wherein the method further comprises requesting authorization for access to a database from said database server.

19. The system of claim 15, wherein the method further comprises receiving access to said database and encrypting data sent to said database and decrypting data received from said database.

20. The system of claim 15, wherein said requesting security access to a database server using a first encryption algorithm further comprises:
building a public key corresponding to said first encryption algorithm; and
sending said public key along with said first encryption algorithm to said database server.

* * * * *